(12) United States Patent
Gong et al.

(10) Patent No.: US 12,277,073 B2
(45) Date of Patent: Apr. 15, 2025

(54) APPARATUS OF INTERCONNECT WITH ON-THE-FLY QUANTIZATION AND OPERATING METHOD THEREOF

(71) Applicant: Kwangwoon University Industry-Academic Collaboration Foundation, Seoul (KR)

(72) Inventors: Young Ho Gong, Seoul (KR); Woo Hyuck Park, Bucheon-si (KR); Ye Bin Kwon, Seoul (KR); Donggyu Sim, Seoul (KR)

(73) Assignee: Kwangwoon University Industry-Academic Collaboration Foundation, Seoul (KR)

( * ) Notice: Subject to any disclaimer, the term of this patent is extended or adjusted under 35 U.S.C. 154(b) by 0 days.

(21) Appl. No.: 18/472,137

(22) Filed: Sep. 21, 2023

(65) Prior Publication Data

US 2024/0119012 A1  Apr. 11, 2024

(30) Foreign Application Priority Data

Oct. 11, 2022 (KR) .................. 10-2022-0129916

(51) Int. Cl.
  *G06F 13/00* (2006.01)
  *G06F 9/50* (2006.01)
  *G06F 13/16* (2006.01)

(52) U.S. Cl.
  CPC ............ *G06F 13/16* (2013.01); *G06F 9/5027* (2013.01)

(58) Field of Classification Search
  CPC .............................. G06F 13/16; G06F 9/5027
  See application file for complete search history.

(56) References Cited

U.S. PATENT DOCUMENTS

| 6,567,426 B1 * | 5/2003 | van Hook ........... G06F 13/1663 370/535 |
| 2018/0018560 A1 * | 1/2018 | Saldana ................ G06N 3/063 |
| 2022/0207358 A1 * | 6/2022 | Nimmagadda ........ G06N 3/063 |

FOREIGN PATENT DOCUMENTS

| KR | 10-2011-0122516 A | 11/2011 |
| KR | 10-2022-0030106 A | 3/2022 |
| KR | 10-2022-0051947 A | 4/2022 |
| KR | 10-2022-0116837 A | 8/2022 |

OTHER PUBLICATIONS

Office Action for KR10-2022-0129916 by Korean Intellectual Property Office dated Jun. 13, 2024.

* cited by examiner

*Primary Examiner* — Reginald G Bragdon
*Assistant Examiner* — Michael L Westbrook
(74) *Attorney, Agent, or Firm* — BROADVIEW IP LAW, PC

(57) ABSTRACT

According to a quantization interconnect apparatus and an operating method thereof according to the exemplary embodiment of the present disclosure, in a quantization artificial neural network accelerator system, the quantization is performed in the interconnect bus according to a precision without separate processing of the CPU/GPU so that as compared with the quantization by a host processor and an accelerator according to a quantization method of the related art, a number of instructions is reduced to improve the performance/memory efficiency. Further, a computational burden of the host process is reduced to reduce the power and improve the performance.

2 Claims, 5 Drawing Sheets

APPARATUS OF INTERCONNECT WITH ON-THE-FLY QUANTIZATION AND OPERATING METHOD THEREOF

CROSS-REFERENCE TO RELATED APPLICATION

This application claims priority under 35 U.S.C § 119 to Korean Patent Application No. 10-2022-0129916, filed in the Korean Intellectual Property Office on Oct. 11, 2022, the entire contents of which are hereby incorporated by reference.

BACKGROUND

Technical Field

The present disclosure relates to a quantization interconnect apparatus and an operating method thereof, and more particularly, to an apparatus for quantizing data and an operating method thereof.

The present patent application has been filed as research projects as described below.

[1] National Research Development Project supporting the Present Invention
 Project Serial No. 1711186025
 Project No.: 2022M3I7A2079155
 Department: Ministry of Science and ICT
 Project management (Professional) Institute: National research Foundation of Korea
 Technology Planning & Evaluation Research Project Name: Original technology development project
 Research Task Name: Development of PIM device, driving circuit, and architecture utilizing various ferroelectric memories
 Contribution Ratio: ½
 Project Performing Institution: Hanyang Univ. Industry-University Cooperation Foundation
 Research Period: Jan. 1, 2023 to Dec. 31, 2023

[2] National Research Development Project supporting the Present Invention
 Project Serial No. 1711179305
 Project No.: IITP-2022-RS-2022-00156225
 Department: Ministry of Science and ICT
 Project management (Professional) Institute: Institute of Information & Communications Technology Planning & Evaluation
 Research Project Name: University ICT Research Center Development Support Project
 Research Task Name: Development of neuro chip design technique and neuro computing platform which imitate human neural system
 Contribution Ratio: ½
 Project Performing Institution: Kwangwoon University Industry-Academic Collaboration Foundation
 Research Period: Jan. 1, 2023 to Dec. 31, 2023

DESCRIPTION OF THE RELATED ART

Quantization based artificial neural networks are widely utilized to perform energy-efficient artificial neural networks. In the case of the quantization artificial neural network, instead of using floating point data types, 16-bit, 8-bit, 4-bit fixed point or integer data types are widely utilized.

FIG. 1 is a view for explaining a quantization artificial neural network accelerator system of the related art.

In the system of the related art, a process of quantizing an input value or a weight by means of a quantization function in a central processing unit is required to achieve the quantization. To be more specific, referring to FIG. 1, when a quantization function of the related art is used, a host processor requests data (1), data from the system memory is loaded in a cache memory of the host processor (2), and the host processor performs the quantization in consideration of precision (3), and then the data is stored in the system memory or an on-chip memory of an accelerator (4). Thereafter, the accelerator performs inference (5) based on quantized data stored in the on-chip memory and a result is stored in a memory. However, according to this method, a processing unit (CPU) with a poor quantization performance participates in the operation so that the performance is degraded and unnecessary data is loaded/stored in an interconnect (bandwidth loss).

SUMMARY

An object to be achieved by the present disclosure, a quantization interconnect apparatus which performs quantization in an interconnect bus according to a precision without separately processing by a CPU/GPU in a quantization artificial neural network accelerator system and an operating method thereof.

Other and further objects of the present disclosure which are not specifically described can be further considered within the scope easily deduced from the following detailed description and the effect.

In order to achieve the above-described technical objects, according to an aspect of the present disclosure, a quantization interconnect apparatus includes at least one processor; at least one system memory; at least one accelerator; and a quantization interconnect which loads data from the system memory based on an instruction when the instruction for the system memory is received from the processor, quantizes the loaded data, and transmits the quantized data to the accelerator.

Here, the quantization interconnect includes a quantization processor which quantizes loaded data based on a precision value while loading the data from the system memory based on the instruction when the instruction and the precision value for the system memory are received from the processor and transmits the data quantized with the precision value to the accelerator.

Here, the quantization processor stores the data quantized with the precision value in the on-chip memory of the accelerator to transmit the quantized data to the accelerator.

In order to achieve the above-described technical objects, according to another aspect of the present disclosure, an operating method of a quantization interconnect apparatus is an operating method of a quantization interconnect apparatus including at least one processor, at least one system memory, at least one accelerator, and a quantization interconnect including transmitting an instruction for the system memory to the quantization interconnect, by the processor; and loading data from the system memory based on an instruction when the instruction for the system memory is received from the processor, quantizing the loaded data, and transmitting the quantized data to the accelerator, by the quantization interconnect.

Here, the transmitting of the data to the accelerator is configured by quantizing loaded data based on a precision value while loading the data from the system memory based on the instruction when the instruction and the precision value for the system memory are received from the processor and transmitting the data quantized with the precision value to the accelerator, by the quantization interconnect.

Here, the transmitting of the data to the accelerator is configured by storing the data quantized with the precision value in the on-chip memory of the accelerator to transmit the quantized data to the accelerator, by the quantization interconnect.

According to a quantization interconnect apparatus and an operating method thereof according to the exemplary embodiment of the present disclosure, in a quantization artificial neural network accelerator system, the quantization is performed in the interconnect bus according to a precision without separate processing by the CPU/GPU so that as compared with the quantization by a host processor and an accelerator according to a quantization method of the related art, a number of instructions is reduced, resulting in the improvement of the performance/memory efficiency.

Further, according to the present disclosure, a computational burden of the host processor is reduced to reduce the power and improve the performance.

The effects of the present disclosure are not limited to the technical effects mentioned above, and other effects which are not mentioned can be clearly understood by those skilled in the art from the following description.

DETAILED DESCRIPTION OF THE EMBODIMENT

Figure 1:
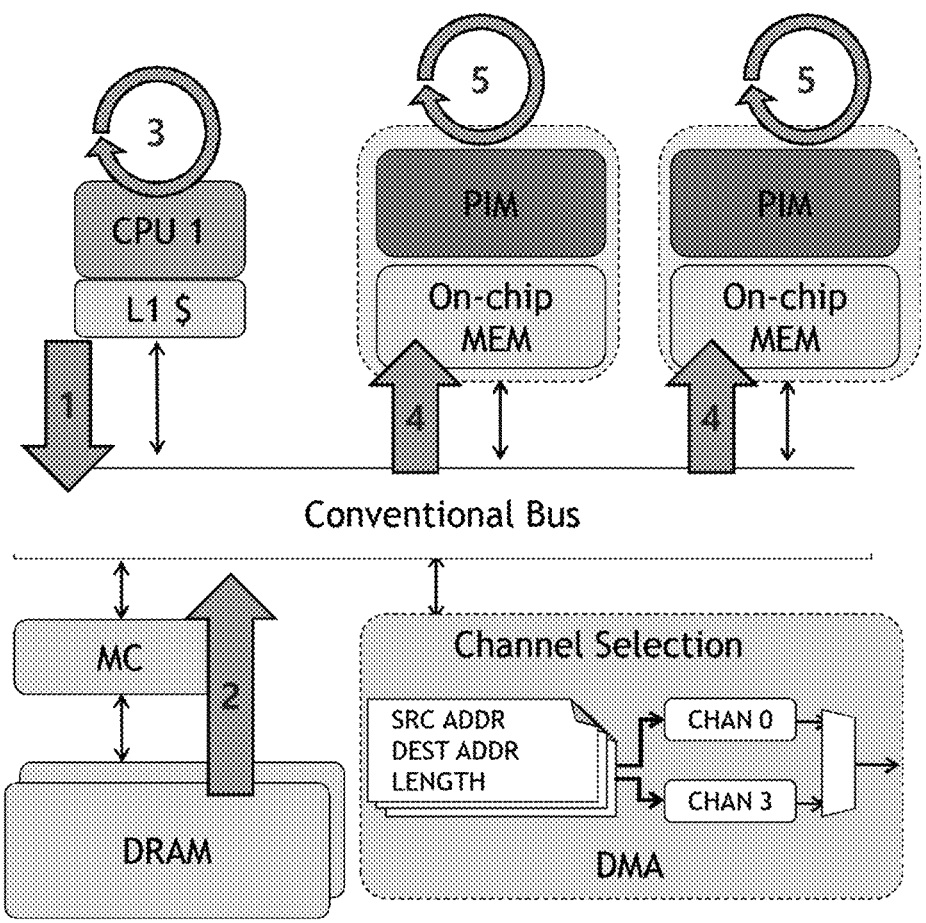
FIG. 1 is a view for explaining a quantization artificial neural network accelerator system of the related art.

Hereinafter, embodiments of the present disclosure will be described in detail with reference to the accompanying drawings. Advantages and characteristics of the present disclosure and a method of achieving the advantages and characteristics will be clear by referring to exemplary embodiments described below in detail together with the accompanying drawings. However, the present invention is not limited to exemplary embodiments disclosed herein but will be implemented in various different forms. The exemplary embodiments are provided by way of example only so that a person of ordinary skilled in the art can fully understand the disclosures of the present invention and the scope of the present invention. Therefore, the present invention will be defined only by the scope of the appended claims. Like reference numerals generally denote like elements throughout the specification.

Unless otherwise defined, all terms (including technical and scientific terms) used in the present specification may be used as the meaning which may be commonly understood by the person with ordinary skill in the art, to which the present invention belongs. It will be further understood that terms defined in commonly used dictionaries should not be interpreted in an idealized or excessive sense unless expressly and specifically defined.

In the specification, the terms "first" or "second" are used to distinguish one component from the other component so that the scope should not be limited by these terms. For example, a first component may be referred to as a second component, and similarly, a second component may be referred to as a first component.

In the present specification, in each step, numerical symbols (for example, a, b, and c) are used for the convenience of description, but do not explain the order of the steps so that unless the context apparently indicates a specific order, the order may be different from the order described in the specification. That is, the steps may be performed in the order as described or simultaneously, or an opposite order.

In this specification, the terms "have", "may have", "include", or "may include" represent the presence of the characteristic (for example, a numerical value, a function, an operation, or a component such as a part"), but do not exclude the presence of additional characteristic.

The term "~unit" used in the specification refers to a software or hardware component such as a field programmable gate array (FPGA) or an ASIC and "unit" performs some functions. However, "unit" is not limited to the software or the hardware. "unit" may be configured to be in an addressable storage medium or may be configured to reproduce one or more processors. Accordingly, as an example, "unit" includes components such as software components, object oriented software components, class components, and task components, processes, functions, attributes, procedures, subroutines, segments of a program code, drivers, a firmware, a microcode, a circuit, data, database, and data structures. A function which is provided in the components and "units" may be combined with a smaller number of components and "~units" or divided into additional components and "~units".

Hereinafter, an exemplary embodiment of a quantization interconnect apparatus and an operating method thereof according to the present disclosure will be described in detail with reference to the accompanying drawings.

A quantization interconnect apparatus according to the exemplary embodiment of the present disclosure will be described with reference to FIG. 2.

Figure 2:
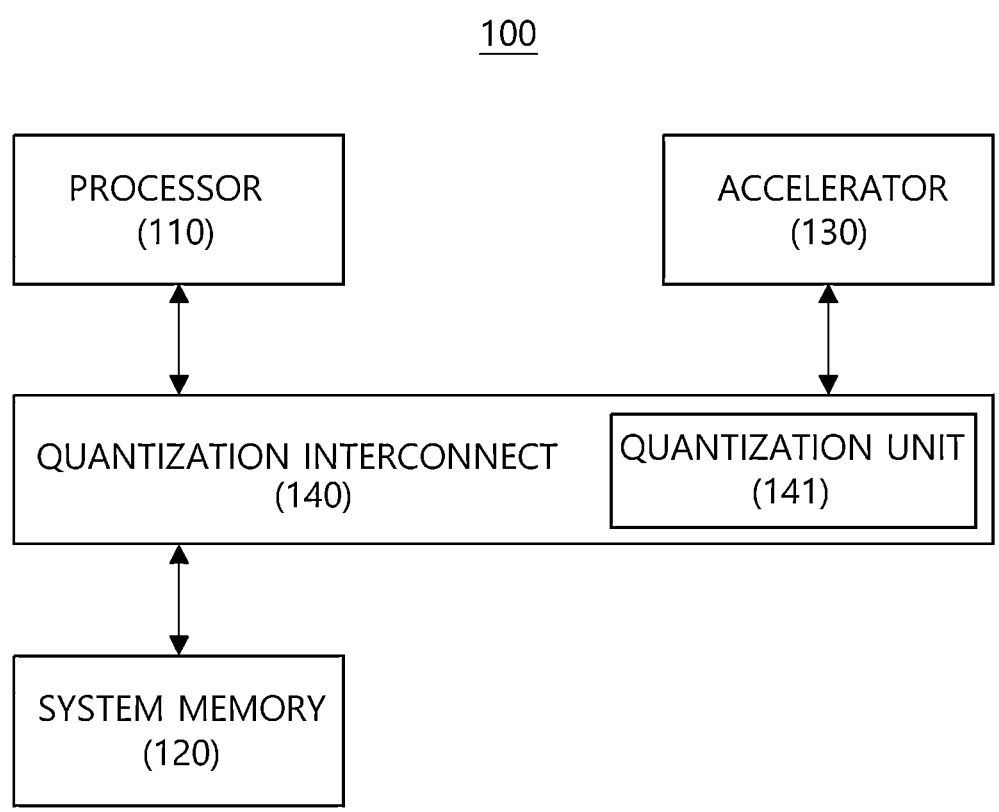
FIG. 2 is a block diagram for explaining a quantization interconnect apparatus according to an exemplary embodiment of the present disclosure.

FIG. 2 is a block diagram for explaining a quantization interconnect apparatus according to an exemplary embodiment of the present disclosure.

Referring to FIG. 2, a quantization interconnect apparatus 100 according to an exemplary embodiment of the present disclosure performs quantization in an interconnect bus according to a precision without separate processing by a CPU/GPU in a quantization artificial neural network accelerator system configured with a system-on-chip (SoC) structure.

In the present disclosure, the quantization refers that continuous values are expressed by discontinuous values in a specific range with a precision for efficiently expressing, storing, and transmitting information, but is not limited thereto.

The precision may indicate a number of bits used to perform the operation.

Accordingly, as compared with the quantization of the related art that the host processor and the accelerator perform the quantization, according to the present disclosure, the number of instructions is reduced to improve the performance/memory efficiency. Further, according to the present disclosure, a computational burden of the host processor is reduced to reduce the power and improve the performance.

To this end, the quantization interconnect apparatus 100 includes at least one processor 110, at least one system memory 120, at least one accelerator 130, and a quantization interconnect 140.

To be more specific, when the quantization interconnect 140 receives an instruction for the system memory 120 from the processor 110, the quantization interconnect 140 loads the data from the system memory 120 in response to the instruction and quantizes the loaded data, and transmits the quantized data to the accelerator 130.

In the present disclosure, the instruction may refer to a specific task to be performed by a computer or other electronic apparatus or a command for a function. The instruction refers to a command which is transmitted from the processor 110 to the quantization interconnect 140 or the system memory 120. The instruction includes a task for loading or quantizing specific data. The processor transmits processing requirements (for example, a precision value) for data through this instruction and the quantization interconnect loads the data and performs the quantization task based thereon.

That is, the quantization interconnect 140 may include a quantization processor 141 which performs the quantization operation.

When the quantization processor 141 receives an instruction for the system memory 120 and the precision value from the processor 110, the quantization processor 141 quantizes the loaded data while loading the data from the system memory 120 in response to the instruction and transmits the data quantized with the precision value to the accelerator 130.

The quantization processor 141 operates in a first reception mode of first receiving an instruction for the system memory 120 from the processor 110, identifying the transmitted instruction, and then receiving the precision value. The quantization processor 141 loads data from the system memory 120 in response to the transmitted instruction during the first reception mode, receives the precision value and checks whether the loaded data matches the precision value, and then quantizes the data. The quantization processor 141 may receive the precision value during the operation of loading the data from the system memory 120 in response to the instruction transmitted during the first reception mode.

The quantization processor 141 may operates in a second reception mode of first receiving the precision value from the processor 110, identifying the received precision value, and then receiving an instruction. The quantization processor 141 receives the precision value during the second reception mode, loads data from the system memory 120 in response to the transmitted instruction, checks whether the loaded data matches the precision value, and then quantizes the data.

The quantization processor 141 operates in a third reception mode of receiving the precision value and the instruction from the processor. In this case, the quantization processor 141 loads the data in the system memory 120 in response to the transmitted instruction, performs the quantization based on the precision value for the loaded data, and transmits the quantized data to the accelerator 130.

The quantization processor 141 sequentially operates in the third reception mode, the second reception mode, and the first reception mode to prioritize rapid data processing at the beginning of operation and then prioritize the precision of the data processing over time.

In contrast, the quantization processor 141 sequentially operates in the first reception mode, the second reception mode, and the third reception mode to prioritize the precision of the data processing at the beginning of operation and then prioritize rapid data processing over time.

That is, the quantization data processor 141 may selectively operate by selecting any one or two of the first reception mode, the second reception mode, and the third reception mode or sequentially operate by changing the modes over time.

When the quantization is performed based on the precision value, it means that when data is given, the precision value is used to determine how precisely expresses the data (that is, how many bits are used to express the data). The data is more briefly expressed according to the precision value, or may be more specifically expressed.

At this time, the quantization processor 141 stores the data quantized with the precision value in the on-chip memory (not illustrated) of the accelerator 130 to transmit the quantized data to the accelerator 130. The accelerator 130 performs the inference based on the quantized data stored in the on-chip memory and stores the result in the memory.

The quantization processor 141 may operate in a first transmission mode of storing the data quantized with the precision value in the on-chip memory of the accelerator 130 to transmit the quantized data to the accelerator 130.

The quantization processor 141 may operate in a second transmission mode of directly transmitting the quantized data to the accelerator 130 without storing the data quantized with the precision value in the on-chip memory of the accelerator 130 and storing the quantized data in the on-chip memory after transmission.

When the quantization processor 141 operates in the first reception mode or the second reception mode, the quantization processor operates in a first processing mode followed by a first transmission mode.

When the quantization processor 141 operates in the third reception mode, the quantization processor may operate in a second processing mode which operates in a second transmission mode.

However, the present disclosure is not limited thereto and even though it operates in the first reception mode or the second reception mode, the quantization processor 141 operates in the second transmission mode and even though it operates in the third reception mode, the quantization processor 141 may operates in the first reception mode.

An operating method of a quantization interconnect apparatus according to the exemplary embodiment of the present disclosure will be described with reference to FIG. 3.

Figure 3:
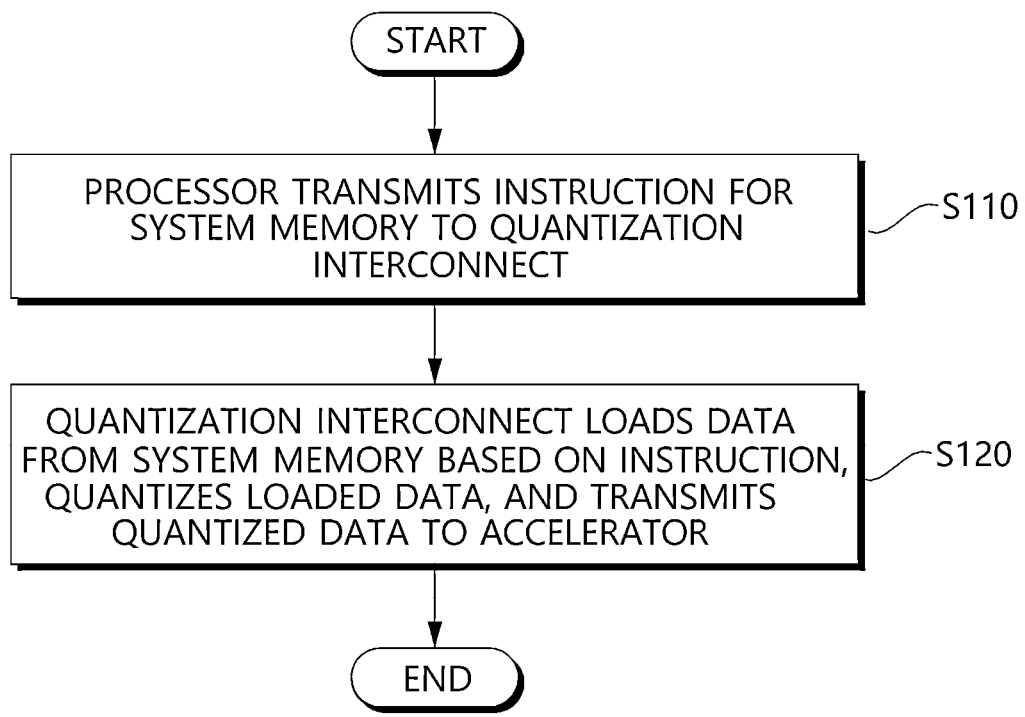
FIG. 3 is a flowchart illustrating an operating method of a quantization interconnect apparatus according to an embodiment of the present disclosure.

FIG. 3 is a flowchart illustrating an operating method of a quantization interconnect apparatus according to an embodiment of the present disclosure.

Referring to FIG. 3, the processor 110 of the quantization interconnect apparatus 100 transmits an instruction for the system memory 120 to the quantization interconnect 140 (S110).

At this time, the processor 110 transmits the precision value to the quantization interconnect 140 together with the instruction for the system memory 120.

Next, when the quantization interconnect 140 of the quantization interconnect apparatus 100 loads the data from the system memory 120 in response to the instruction for the system memory 120 and quantizes the loaded data, and transmits the quantized data to the accelerator 130 (S120).

That is, when the quantization interconnect 140 receives the instruction for the system memory 120 and the precision value from the processor 110, the quantization processor 141 quantizes the loaded data based on the precision while loading the data from the system memory 120 in response to the instruction and transmits the data quantized with the precision value to the accelerator 130.

At this time, the quantization interconnect 140 stores the data quantized with the precision value in the on-chip memory of the accelerator 130 to transmit the quantized data to the accelerator 130.

Thereafter, the accelerator 130 performs the inference based on the quantized data stored in the on-chip memory and stores the result in the memory.

An example of an operating method of the quantization interconnect apparatus according to the exemplary embodiment of the present disclosure will be described with reference to FIGS. 4 and 5.

Figure 4:
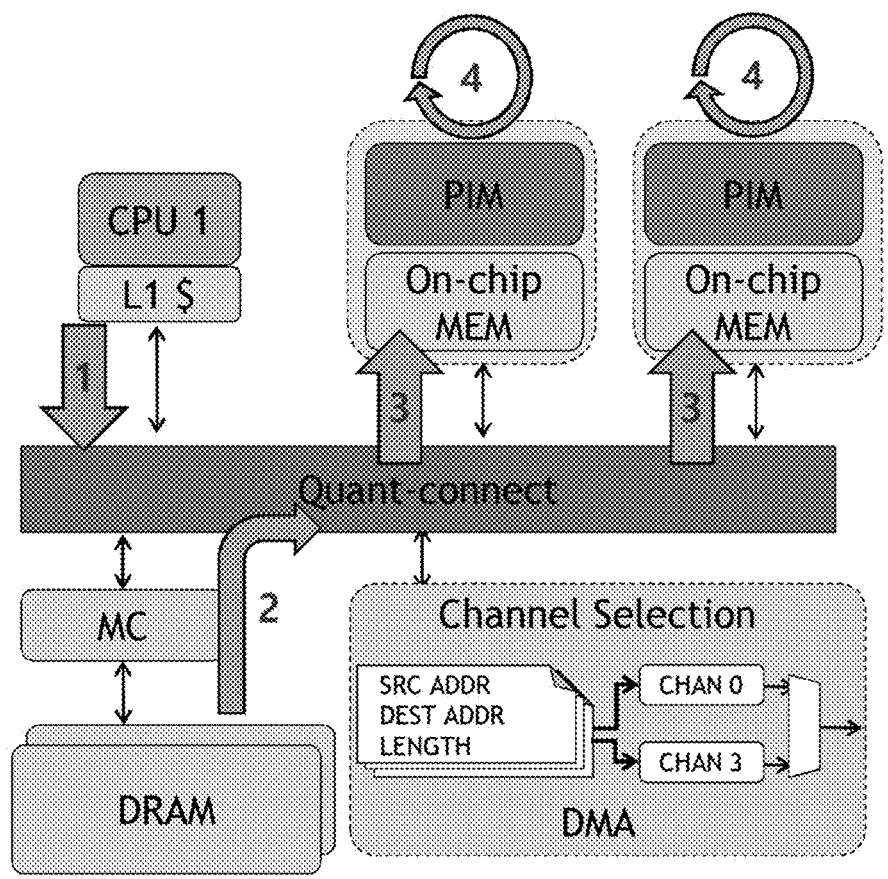
FIG. 4 is a view for explaining an example of an operating method of a quantization interconnect apparatus according to an embodiment of the present disclosure.
Figure 5:
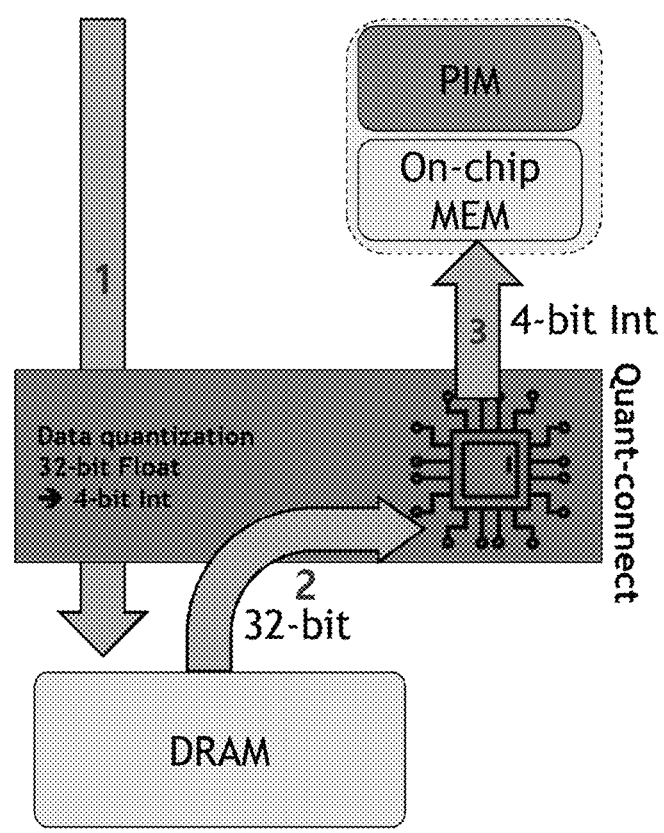
FIG. 5 is a view for explaining a detailed operation of a quantization processor illustrated in FIG. 4.

FIG. 4 is a view for explaining an example of an operating method of a quantization interconnect apparatus according to an embodiment of the present disclosure and FIG. 5 is a view for explaining a detailed operation of a quantization processor illustrated in FIG. 4.

Referring to FIG. 4, unlike the system of the related art, the host processor 110 according to the present disclosure also transmits the precision value to the quantization interconnect 140 upon the request of data.

Next, according to the present disclosure, after loading data which is requested to the system memory 120 in the quantization interconnect 140, the quantization is performed (2) with a target precision through the quantization processor 141 present on the quantization interconnect 140.

Here, the present disclosure is a structure which quantizes (2) the data while loading (3) the data to store the data in the on-chip memory of the accelerator 130 so that it is assumed that the quantization processor 141 located in the quantization interconnect 140 is designed to satisfy a bandwidth of the quantization interconnect 140.

Thereafter, the quantized data is directly stored (3) in the on-chip memory of the accelerator 130 without passing through the processor 110 and the accelerator 130 performs the computation (4) based on the data stored in the on-chip memory.

For example, as illustrated in FIG. 5, the quantization processor 141 quantizes the data in a "4-bit Int" format according to the precision value transmitted from the processor 110 while loading a "32-bit float" type data in the system memory 120 and stores the quantized data in the on-chip memory of the accelerator 130.

According to the present disclosure, the process of the system of the related art in which the processor 110 such as a CPU performs the quantization and then stores the data again is performed by the quantization interconnect 140 so that the bottleneck phenomenon between the CPU and the memory is solved and the computational efficiency is increased.

Even though it has been described above that all components of the exemplary embodiment of the present invention are combined as one component or operate to be combined, the present invention is not limited to the exemplary embodiment. In other words, one or more components may be selectively combined to be operated within a scope of the present invention. Further, all components may be implemented as one independent hardware but a part or all of the components are selectively combined to be implemented as a computer program which includes a program module which performs a part or all functions combined in one or plural hardwares. Further, such a computer program may be stored in a computer readable media such as a USB memory, a CD disk, or a flash memory to be read and executed by a computer to implement the exemplary embodiment of the present invention. The recording media of the computer program may include a magnetic recording medium or an optical recording medium.

The above description illustrates a technical spirit of the present invention as an example and various changes, modifications, and substitutions become apparent to those skilled in the art within a scope of an essential characteristic of the present invention. Therefore, as is evident from the foregoing description, the exemplary embodiments and accompanying drawings disclosed in the present invention do not limit the technical spirit of the present invention and the scope of the technical spirit is not limited by the exemplary embodiments and accompanying drawings. The protective scope of the present disclosure should be construed based on the following claims, and all the technical concepts in the equivalent scope thereof should be construed as falling within the scope of the present disclosure.

What is claimed is:

1. A quantization interconnect apparatus comprising:
at least one processor;
at least one system memory;
at least one accelerator; and
a quantization interconnect which, when receiving an instruction for the system memory from the processor, loads data from the system memory based on the instruction when the instruction for the system memory is received from the processor, quantizes the loaded data, and transmits the quantized data to the accelerator,
wherein the quantization interconnect includes a quantization unit which, when receiving the instruction and an operational precision value for the system memory from the processor, loads the data from the system memory based on the instruction, quantizes the loaded data based on the operational precision value, and transmits the data quantized with the operational precision value to the accelerator,
wherein the quantization unit stores the data quantized with the operational precision value in the on-chip memory of the accelerator, thereby transmitting the quantized data directly to the accelerator without passing through the processor,
wherein the accelerator performs inference operations based on the quantized data stored in the on-chip memory and stores the results in the system memory, and
wherein the quantization unit is a quantization interconnect device designed to meet the bandwidth requirements of the quantization interconnect.

2. An operating method of a quantization interconnect apparatus including at least one processor, at least one system memory, at least one accelerator, and a quantization interconnect, the operation method comprising:
transmitting, by the processor, an instruction for the system memory to the quantization interconnect; and
loading data from the system memory based on the instruction, quantizing the loaded data, and transmitting the quantized data to the accelerator, by the quantization interconnect, when the instruction for the system memory is received from the processor,
wherein the transmitting of the data to the accelerator is configured to satisfy the bandwidth of the quantization interconnect, and the quantization interconnect includes a quantization unit configured to:
receive the instruction for the system memory and a precision value from the processor;

load the data from the system memory based on the instruction while performing quantization on the loaded data based on the precision value; and transmit the data quantized with the precision value to the accelerator, wherein the transmitting of the data to the accelerator is performed by storing the data quantized with the precision value in the on-chip memory of the accelerator, thereby transmitting the quantized data directly to the accelerator without passing through the processor, and wherein the operating method further comprises:
  performing, by the accelerator, inference operations based on the quantized data stored in the on-chip memory; and
  storing the results of the inference operations in the system memory.

* * * * *